(12) United States Patent
Manchikalapati et al.

(10) Patent No.: US 12,423,159 B2
(45) Date of Patent: Sep. 23, 2025

(54) SYSTEM AND METHOD FOR PROVIDING CONTINUOUS OPTIMIZATION WORKFLOW

(71) Applicant: JPMorgan Chase Bank, N.A., New York, NY (US)

(72) Inventors: Anantha Manchikalapati, Hyderabad (IN); SriHarsha Anika, Hyderabad (IN); Dinesh Bhaniga, Hyderabad (IN); Ravi Pasupuleti, Mumbai (IN); Venkateswarlu Yadavalli, Hyderabad (IN); Shariq Javed, Mumbai (IN); Bhavya Shah, Mumbai (IN); Mohit Arora, Hyderabad (IN); Ravi Kappagantu, Hyderabad (IN)

(73) Assignee: JPMORGAN CHASE BANK, N.A., New York, NY (US)

( * ) Notice: Subject to any disclaimer, the term of this patent is extended or adjusted under 35 U.S.C. 154(b) by 779 days.

(21) Appl. No.: 17/647,878

(22) Filed: Jan. 13, 2022

(65) Prior Publication Data
US 2023/0161636 A1    May 25, 2023

(30) Foreign Application Priority Data
Nov. 22, 2021 (IN) .............................. 202111053508

(51) Int. Cl.
*G06F 9/46* (2006.01)
*G06F 9/445* (2018.01)
*G06F 9/50* (2006.01)

(52) U.S. Cl.
CPC ........ *G06F 9/5055* (2013.01); *G06F 9/44505* (2013.01); *G06F 9/5072* (2013.01); *G06F 9/5077* (2013.01)

(58) Field of Classification Search
CPC .. G06F 9/5055; G06F 9/44505; G06F 9/5072; G06F 9/5077
See application file for complete search history.

*Primary Examiner* — Gregory A Kessler
(74) *Attorney, Agent, or Firm* — GREENBLUM & BERNSTEIN, P.L.C.

(57) ABSTRACT

A system and method for dynamically generating and implementing optimization solutions via a centralized cloud based system for increasing available resources of a cloud based infrastructure for deployment is disclosed. The method including acquiring, for at least one platform, resource utilization data, identifying a plurality of optimization tools based on the acquired resource utilization data, and selecting at least one optimization tool for implementation. The method further includes dynamically and automatically generating the at least one optimization tool in response to an input, and implementing the at least one optimization tool dynamically and automatically generated for the at least one application selected that is residing in the one or more platforms selected.

20 Claims, 8 Drawing Sheets

SYSTEM AND METHOD FOR PROVIDING CONTINUOUS OPTIMIZATION WORKFLOW

CROSS-REFERENCE TO RELATED APPLICATION(S)

This application claims priority benefit from Indian Application No. 202111053508, filed Nov. 22, 2021, which is hereby incorporated by reference in its entirety.

TECHNICAL FIELD

This disclosure generally relates to a system and method for providing a centralized infrastructure optimization system to actively monitor resource utilization across various environments of an organization, and deploying selective low/no coding optimization solution(s) for more efficient resource utilization and to free up resources for improved performance or deployment.

BACKGROUND

The developments described in this section are known to the inventors. However, unless otherwise indicated, it should not be assumed that any of the developments described in this section qualify as prior art merely by virtue of their inclusion in this section, or that those developments are known to a person of ordinary skill in the art.

There are currently various dashboards available which provide analytics on various environment utilization and recommendations on what can be done to improve and optimize system performance by actively monitoring and releasing of unused resources for better control on infrastructure cost. However, the scattered dashboards may only provide analytics and one or more recommendations, but due to system limitations, many of the recommendations are not practically feasible. Some of the limitations include, lack of automated onboarding, fragile and scattered tools and dashboards, governance requires back and forth approvals leading to lengthy approval process, lack of standard telemetry, inability to visualize or test quickly after implementation of a recommendation, and lack of collaboration between multiple stake holders. Accordingly, in view of the above noted limitations, for application owners to act upon these recommendations, significant technical knowledge and man hours may be required for implementing the recommendations provided, leading to less than optimal performance of the platforms affected.

SUMMARY

According to an aspect of the present disclosure, a method for dynamically generating and implementing optimization solutions via a centralized cloud based system for increasing available resources of a cloud based infrastructure is provided. The method includes acquiring, by a processor and for at least one platform, resource utilization data; identifying, by the processor, optimization tools based on the acquired resource utilization data; selecting, among the optimization tools identified, at least one optimization tool for implementation; selecting at least one application to which the optimization tool is to be implemented; selecting one or more platforms for the selected at least one application; receiving an input to submit a request for implementation of the at least one optimization tool; dynamically and automatically generating, by the processor, the at least one optimization tool; and implementing the at least one optimization tool dynamically and automatically generated for the at least one application selected, that is residing in the one or more platforms selected.

According to another aspect of the present disclosure, the implementation of the at least one optimization tool includes installation of a light switch, the light switch is configured to be installed for applications that are currently running and is defaulted to be in an off status to release memory occupied by the at least one application to which the light switch is installed.

According to another aspect of the present disclosure, the implementation of the at least one optimization tool includes deployment of a memory optimization API, the memory optimization API scans the at least one platform to determine current memory utilization and performs resizing of memory allocation at a micro-service level.

According to yet another aspect of the present disclosure, the implementation of the at least one optimization tool includes deployment of a CPU optimization API, the CPU optimization API scans the at least one platform to determine CPU utilization and reallocates CPU resources based on the determined CPU utilization.

According to another aspect of the present disclosure, the implementation of the at least one optimization tool includes deployment of a hygiene API, the hygiene API scans through the at least one platform to detect unused applications, services or routes and releases the unused applications, services or routes.

According to a further aspect of the present disclosure, the implementation of the at least one optimization tool includes deployment of a decommission API, the decommission API scans through the at least one platform to detect one or more unused virtual server infrastructures (VSIs), and decommission the one or more unused VSIs to release resources tied thereto.

According to yet another aspect of the present disclosure, the input received to initiate implementation is a single click.

According to a further aspect of the present disclosure, the method further includes determining whether the at least one application selected is owned by a user submitting the request for implementation; when the at least one application selected is not owned by the user submitting the request: identifying application owner information for the at least one application selected, generating an approval request for the implementation of the at least one optimization tool to the at least one application selected, the approval request including a configuration route to a URL, and proceeding with the implementation of the at least one optimization tool when approval is received from the application owner. When the at least one application selected is owned by the user submitting the request, proceeding with the implementation of the at least one optimization tool.

According to another aspect of the present disclosure, the dynamically and automatically generating of the at least one optimization tool includes: generating a blueprint for the at least one optimization tool; generating code for the blueprint; and provisioning of the code in a test container.

According to a further aspect of the present disclosure, the method further includes selecting of space and pools for the implementation of the at least one optimization tool.

According to a further aspect of the present disclosure, the method further includes selecting of at least one cluster for the implementation of the at least one optimization tool.

According to a further aspect of the present disclosure, the method further includes selecting a schedule for the implementation of the at least one optimization tool, in which the schedule is selected in accordance with a priority of the at least one optimization tool.

According to a further aspect of the present disclosure, the method further includes setting an operation schedule for the at least one optimization tool to be implemented, such that the at least one optimization tool is operating at select time intervals.

According to a further aspect of the present disclosure, the method further includes tracking of implementation status of the at least one optimization tool; and providing of the implementation status on a display.

According to another aspect of the present disclosure, multiple optimization tools are identified based on the acquired resource utilization data with respect to threshold values set.

According to another aspect of the present disclosure, multiple optimization tools are identified based on one or more data patterns recognized in the acquired resource utilization data by an artificial intelligence or machine learning algorithm.

According to another aspect of the present disclosure, the method further includes generating configuration files for the at least one optimization tool implemented; pushing the configuration files into a bi-bucket; and raising pull-request.

According to another aspect of the present disclosure, when an optimization tool has been previously implemented, updating configuration information of the optimization tool to update its configuration with the acquired resource utilization data.

According to another aspect of the present disclosure, a centralized cloud based system for dynamically generating and implementing optimization solutions to increase available resources of a cloud based infrastructure is provided. The centralized cloud based system includes a processor, a memory, and a communication circuit. The processor is configured to acquire, for at least one platform, resource utilization data; identify optimization tools based on the acquired resource utilization data; select, among the optimization tools identified, at least one optimization tool for implementation; select at least one application to which the optimization tool is to be implemented; select one or more platforms for the selected at least one application; receive an input to submit a request for implementation of the at least one optimization tool; dynamically and automatically generate the at least one optimization tool; and implement the at least one optimization tool dynamically and automatically generated for the at least one application selected, that is residing in the one or more platforms selected.

According to another aspect of the present disclosure, a non-transitory computer readable storage medium that stores a computer program for dynamically generating and implementing optimization solutions via a centralized cloud based system for increasing available resources of a cloud based infrastructure, the computer program, when executed by a processor, causing a system to perform a process. The process includes acquiring, for at least one platform, resource utilization data; identifying optimization tools based on the acquired resource utilization data; selecting, among the optimization tools identified, at least one optimization tool for implementation; selecting at least one application to which the optimization tool is to be implemented; selecting one or more platforms for the selected at least one application; receiving an input to submit a request for implementation of the at least one optimization tool; dynamically and automatically generating the at least one optimization tool; and implementing the at least one optimization tool dynamically and automatically generated for the at least one application selected, that is residing in the one or more platforms selected.

BRIEF DESCRIPTION OF THE DRAWINGS

The present disclosure is further described in the detailed description which follows, in reference to the noted plurality of drawings, by way of non-limiting examples of preferred embodiments of the present disclosure, in which like characters represent like elements throughout the several views of the drawings.

DETAILED DESCRIPTION

Figure 1:
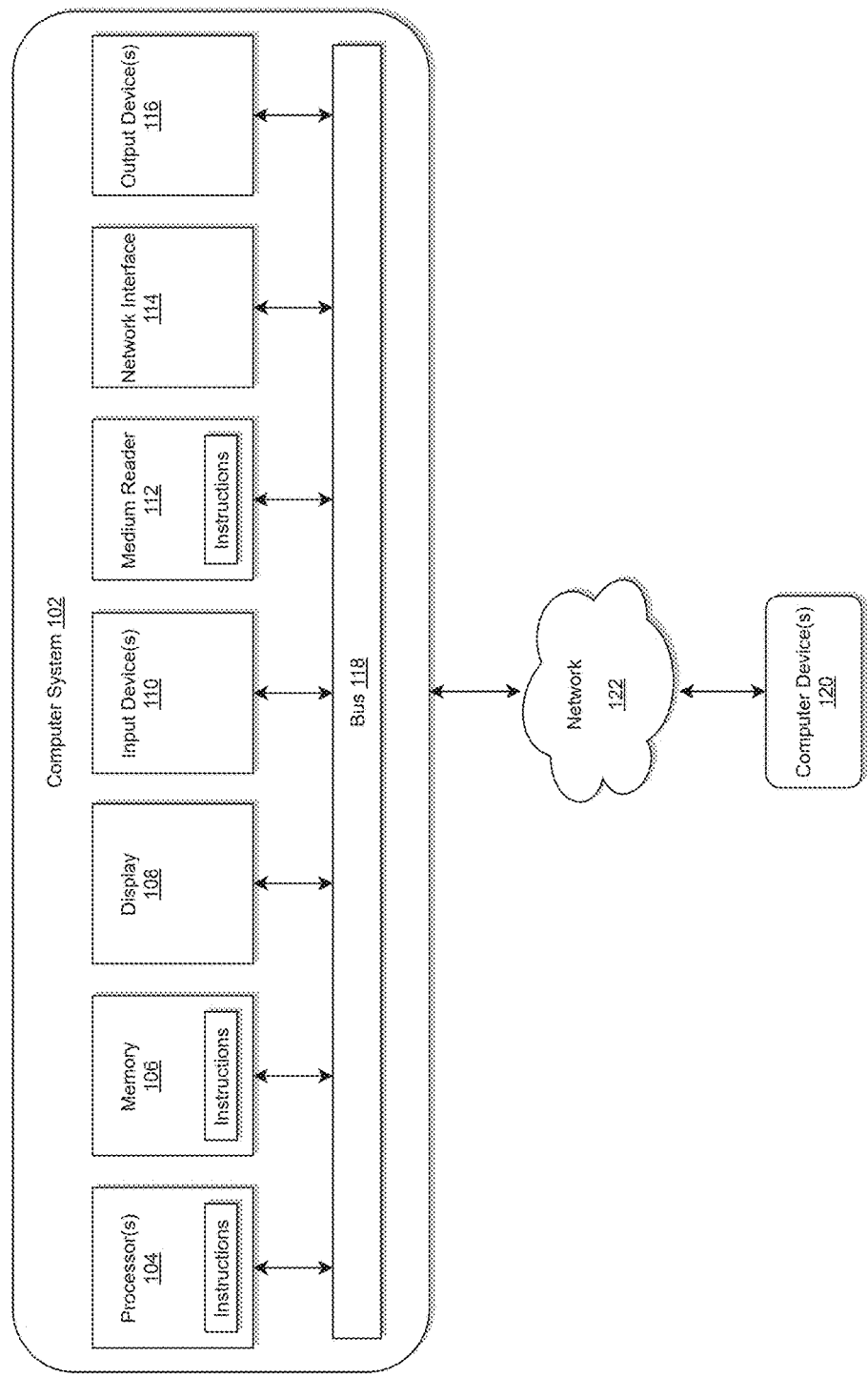
FIG. 1 illustrates a computer system for implementing a system for realizing a Kuber system in accordance with an exemplary embodiment.

Through one or more of its various aspects, embodiments and/or specific features or sub-components of the present disclosure, are intended to bring out one or more of the advantages as specifically described above and noted below.

The examples may also be embodied as one or more non-transitory computer readable media having instructions stored thereon for one or more aspects of the present technology as described and illustrated by way of the examples herein. The instructions in some examples include executable code that, when executed by one or more processors, cause the processors to carry out steps necessary to implement the methods of the examples of this technology that are described and illustrated herein.

As is traditional in the field of the present disclosure, example embodiments are described, and illustrated in the drawings, in terms of functional blocks, units and/or modules. Those skilled in the art will appreciate that these blocks, units and/or modules are physically implemented by electronic (or optical) circuits such as logic circuits, discrete components, microprocessors, hard-wired circuits, memory elements, wiring connections, and the like, which may be formed using semiconductor-based fabrication techniques or other manufacturing technologies. In the case of the blocks, units and/or modules being implemented by microprocessors or similar, they may be programmed using software (e.g., microcode) to perform various functions discussed herein and may optionally be driven by firmware and/or software. Alternatively, each block, unit and/or module may be implemented by dedicated hardware, or as a combination of dedicated hardware to perform some functions and a processor (e.g., one or more programmed microprocessors and associated circuitry) to perform other functions. Also, each block, unit and/or module of the example embodiments may be physically separated into two or more interacting and discrete blocks, units and/or modules without departing from the scope of the inventive concepts. Further, the blocks, units and/or modules of the example embodiments may be physically combined into more complex blocks, units and/or modules without departing from the scope of the present disclosure.

FIG. 1 illustrates a computer system for implementing a system for realizing a Kuber system in accordance with an exemplary embodiment.

The system 100 is generally shown and may include a computer system 102, which is generally indicated. The computer system 102 may include a set of instructions that can be executed to cause the computer system 102 to perform any one or more of the methods or computer-based functions disclosed herein, either alone or in combination with the other described devices. The computer system 102 may operate as a standalone device or may be connected to other systems or peripheral devices. For example, the computer system 102 may include, or be included within, any one or more computers, servers, systems, communication networks or cloud environment. Even further, the instructions may be operative in such cloud-based computing environment.

In a networked deployment, the computer system 102 may operate in the capacity of a server or as a client user computer in a server-client user network environment, a client user computer in a cloud computing environment, or as a peer computer system in a peer-to-peer (or distributed) network environment. The computer system 102, or portions thereof, may be implemented as, or incorporated into, various devices, such as a personal computer, a tablet computer, a set-top box, a personal digital assistant, a mobile device, a palmtop computer, a laptop computer, a desktop computer, a communications device, a wireless smart phone, a personal trusted device, a wearable device, a global positioning satellite (GPS) device, a web appliance, or any other machine capable of executing a set of instructions (sequential or otherwise) that specify actions to be taken by that machine. Further, while a single computer system 102 is illustrated, additional embodiments may include any collection of systems or sub-systems that individually or jointly execute instructions or perform functions. The term system shall be taken throughout the present disclosure to include any collection of systems or sub-systems that individually or jointly execute a set, or multiple sets, of instructions to perform one or more computer functions.

As illustrated in FIG. 1, the computer system 102 may include at least one processor 104. The processor 104 is tangible and non-transitory. As used herein, the term "non-transitory" is to be interpreted not as an eternal characteristic of a state, but as a characteristic of a state that will last for a period of time. The term "non-transitory" specifically disavows fleeting characteristics such as characteristics of a particular carrier wave or signal or other forms that exist only transitorily in any place at any time. The processor 104 is an article of manufacture and/or a machine component. The processor 104 is configured to execute software instructions in order to perform functions as described in the various embodiments herein. The processor 104 may be a general-purpose processor or may be part of an application specific integrated circuit (ASIC). The processor 104 may also be a microprocessor, a microcomputer, a processor chip, a controller, a microcontroller, a digital signal processor (DSP), a state machine, or a programmable logic device. The processor 104 may also be a logical circuit, including a programmable gate array (PGA) such as a field programmable gate array (FPGA), or another type of circuit that includes discrete gate and/or transistor logic. The processor 104 may be a central processing unit (CPU), a graphics processing unit (GPU), or both. Additionally, any processor described herein may include multiple processors, parallel processors, or both. Multiple processors may be included in, or coupled to, a single device or multiple devices.

The computer system 102 may also include a computer memory 106. The computer memory 106 may include a static memory, a dynamic memory, or both in communication. Memories described herein are tangible storage mediums that can store data and executable instructions, and are non-transitory during the time instructions are stored therein. Again, as used herein, the term "non-transitory" is to be interpreted not as an eternal characteristic of a state, but as a characteristic of a state that will last for a period of time. The term "non-transitory" specifically disavows fleeting characteristics such as characteristics of a particular carrier wave or signal or other forms that exist only transitorily in any place at any time. The memories are an article of manufacture and/or machine component. Memories described herein are computer-readable mediums from which data and executable instructions can be read by a computer. Memories as described herein may be random access memory (RAM), read only memory (ROM), flash memory, electrically programmable read only memory (EPROM), electrically erasable programmable read-only memory (EEPROM), registers, a hard disk, a cache, a removable disk, tape, compact disk read only memory (CD-ROM), digital versatile disk (DVD), floppy disk, blu-ray disk, or any other form of storage medium known in the art. Memories may be volatile or non-volatile, secure and/or encrypted, unsecure and/or unencrypted. Of course, the computer memory 106 may comprise any combination of memories or a single storage.

The computer system 102 may further include a display 108, such as a liquid crystal display (LCD), an organic light emitting diode (OLED), a flat panel display, a solid-state display, a cathode ray tube (CRT), a plasma display, or any other known display.

The computer system 102 may also include at least one input device 110, such as a keyboard, a touch-sensitive input screen or pad, a speech input, a mouse, a remote control device having a wireless keypad, a microphone coupled to a speech recognition engine, a camera such as a video camera or still camera, a cursor control device, a global positioning system (GPS) device, an altimeter, a gyroscope, an accelerometer, a proximity sensor, or any combination thereof. Those skilled in the art appreciate that various embodiments of the computer system 102 may include multiple input devices 110. Moreover, those skilled in the art further appreciate that the above-listed, exemplary input devices 110 are not meant to be exhaustive and that the computer system 102 may include any additional, or alternative, input devices 110.

The computer system 102 may also include a medium reader 112 which is configured to read any one or more sets of instructions, e.g., software, from any of the memories described herein. The instructions, when executed by a processor, can be used to perform one or more of the methods and processes as described herein. In a particular embodiment, the instructions may reside completely, or at least partially, within the memory 106, the medium reader 112, and/or the processor 110 during execution by the computer system 102.

Furthermore, the computer system 102 may include any additional devices, components, parts, peripherals, hardware, software or any combination thereof which are commonly known and understood as being included with or within a computer system, such as, but not limited to, a network interface 114 and an output device 116. The network interface 114 may include, without limitation, a communication circuit, a transmitter or a receiver. The output device 116 may be, but is not limited to, a speaker, an audio out, a video out, a remote control output, a printer, or any combination thereof.

Each of the components of the computer system 102 may be interconnected and communicate via a bus 118 or other communication link. As shown in FIG. 1, the components may each be interconnected and communicate via an internal bus. However, those skilled in the art appreciate that any of the components may also be connected via an expansion bus. Moreover, the bus 118 may enable communication via any standard or other specification commonly known and understood such as, but not limited to, peripheral component interconnect, peripheral component interconnect express, parallel advanced technology attachment, serial advanced technology attachment, etc.

The computer system 102 may be in communication with one or more additional computer devices 120 via a network 122. The network 122 may be, but is not limited to, a local area network, a wide area network, the Internet, a telephony network, a short-range network, or any other network commonly known and understood in the art. The short-range network may include, for example, Bluetooth, Zigbee, infrared, near field communication, ultraband, or any combination thereof. Those skilled in the art appreciate that additional networks 122 which are known and understood may additionally or alternatively be used and that the exemplary networks 122 are not limiting or exhaustive. Also, while the network 122 is shown in FIG. 1 as a wireless network, those skilled in the art appreciate that the network 122 may also be a wired network.

The additional computer device 120 is shown in FIG. 1 as a personal computer. However, those skilled in the art appreciate that, in alternative embodiments of the present application, the computer device 120 may be a laptop computer, a tablet PC, a personal digital assistant, a mobile device, a palmtop computer, a desktop computer, a communications device, a wireless telephone, a personal trusted device, a web appliance, a server, or any other device that is capable of executing a set of instructions, sequential or otherwise, that specify actions to be taken by that device. Of course, those skilled in the art appreciate that the above-listed devices are merely exemplary devices and that the device 120 may be any additional device or apparatus commonly known and understood in the art without departing from the scope of the present application. For example, the computer device 120 may be the same or similar to the computer system 102. Furthermore, those skilled in the art similarly understand that the device may be any combination of devices and apparatuses.

Of course, those skilled in the art appreciate that the above-listed components of the computer system 102 are merely meant to be exemplary and are not intended to be exhaustive and/or inclusive. Furthermore, the examples of the components listed above are also meant to be exemplary and similarly are not meant to be exhaustive and/or inclusive.

In accordance with various embodiments of the present disclosure, the methods described herein may be implemented using a hardware computer system that executes software programs. Further, in an exemplary, non-limited embodiment, implementations can include distributed processing, component/object distributed processing, and an operation mode having parallel processing capabilities. Virtual computer system processing can be constructed to implement one or more of the methods or functionality as described herein, and a processor described herein may be used to support a virtual processing environment.

Figure 2:
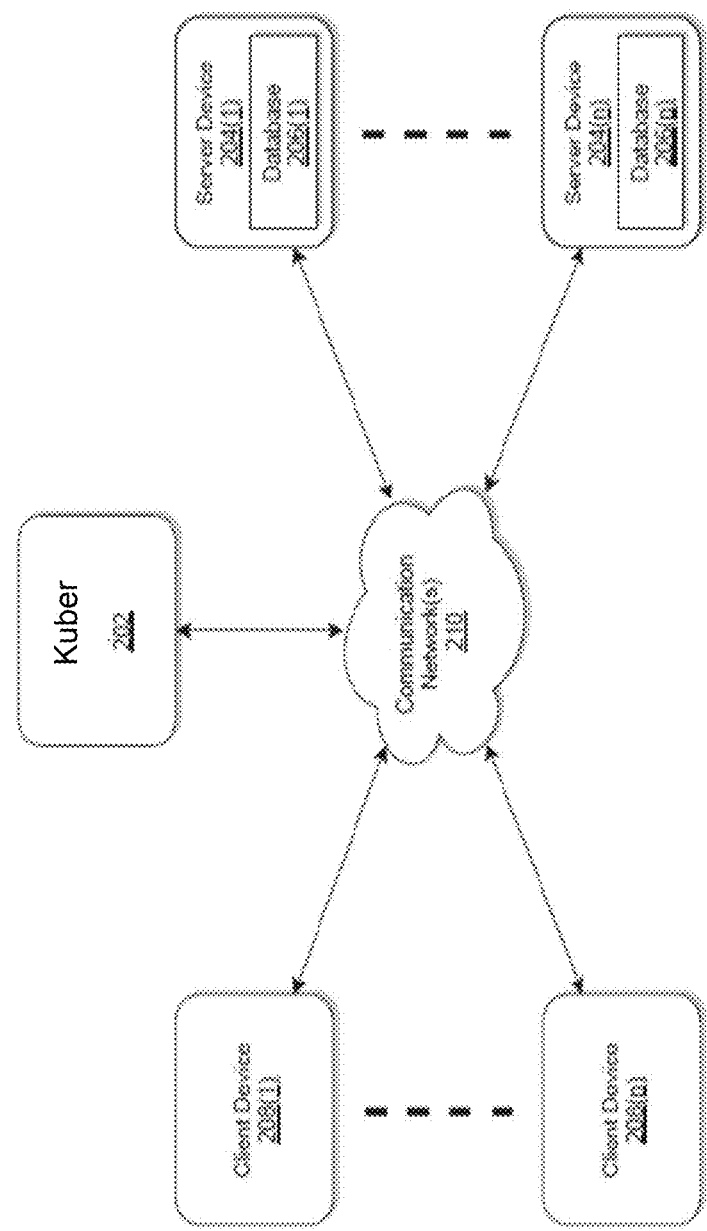
FIG. 2 illustrates an exemplary diagram of a network environment with a cloud native Kuber system in accordance with an exemplary embodiment.

FIG. 2 illustrates an exemplary diagram of a network environment with a cloud native Kuber system in accordance with an exemplary embodiment.

The Kuber system 202 may be the same or similar to the computer system 102 as described with respect to FIG. 1.

The Kuber system 202 may store one or more applications that can include executable instructions that, when executed by the Kuber system 202, cause the Kuber system 202 to perform actions, such as to transmit, receive, or otherwise process network messages, for example, and to perform other actions described and illustrated below with reference to the figures. The application(s) may be implemented as modules or components of other applications. Further, the application(s) can be implemented as operating system extensions, modules, plugins, or the like.

Even further, the application(s) may be operative in a cloud-based computing environment. The application(s) may be executed within or as virtual machine(s) or virtual server(s) that may be managed in a cloud-based computing environment. Also, the application(s), and even the Kuber system 202 itself, may be located in virtual server(s) running in a cloud-based computing environment rather than being tied to one or more specific physical network computing devices. Also, the application(s) may be running in one or more virtual machines (VMs) executing on the Kuber system 202. Additionally, in one or more embodiments of this technology, virtual machine(s) running on the Kuber system 202 may be managed or supervised by a hypervisor.

In the network environment 200 of FIG. 2, the Kuber system 202 is coupled to a plurality of server devices 204(1)-204(n) that hosts a plurality of databases 206(1)-206(n), and also to a plurality of client devices 208(1)-208(n) via communication network(s) 210. A communication interface of the Kuber system 202, such as the network interface 114 of the computer system 102 of FIG. 1, operatively couples and communicates between the Kuber system 202, the server devices 204(1)-204(n), and/or the client devices 208(1)-208(n), which are all coupled together by the communication network(s) 210, although other types and/or numbers of communication networks or systems with other types and/or numbers of connections and/or configurations to other devices and/or elements may also be used.

The communication network(s) 210 may be the same or similar to the network 122 as described with respect to FIG. 1, although the Kuber system 202, the server devices 204(1)-204(n), and/or the client devices 208(1)-208(n) may be coupled together via other topologies. Additionally, the network environment 200 may include other network devices such as one or more routers and/or switches, for example, which are well known in the art and thus will not be described herein.

By way of example only, the communication network(s) 210 may include local area network(s) (LAN(s)) or wide area network(s) (WAN(s)), and can use TCP/IP over Ethernet and industry-standard protocols, although other types and/or numbers of protocols and/or communication networks may be used. The communication network(s) 202 in this example may employ any suitable interface mechanisms and network communication technologies including, for example, teletraffic in any suitable form (e.g., voice, modem, and the like), Public Switched Telephone Network (PSTNs), Ethernet-based Packet Data Networks (PDNs), combinations thereof, and the like.

The Kuber system 202 may be a standalone device or integrated with one or more other devices or apparatuses, such as one or more of the server devices 204(1)-204(n), for example. In one particular example, the Kuber system 202 may be hosted by one of the server devices 204(1)-204(n), and other arrangements are also possible. Moreover, one or more of the devices of the Kuber system 202 may be in the same or a different communication network including one or more public, private, or cloud networks, for example.

The plurality of server devices 204(1)-204(n) may be the same or similar to the computer system 102 or the computer device 120 as described with respect to FIG. 1, including any features or combination of features described with respect thereto. For example, any of the server devices 204(1)-204(n) may include, among other features, one or more processors, a memory, and a communication interface, which are coupled together by a bus or other communication link, although other numbers and/or types of network devices may be used. The server devices 204(1)-204(n) in this example may process requests received from the Kuber system 202 via the communication network(s) 210 according to the HTTP-based protocol, for example, although other protocols may also be used. According to a further aspect of the present disclosure, in which the user interface may be a Hypertext Transfer Protocol (HTTP) web interface, but the disclosure is not limited thereto.

The server devices 204(1)-204(n) may be hardware or software or may represent a system with multiple servers in a pool, which may include internal or external networks. The server devices 204(1)-204(n) hosts the databases 206(1)-206(n) that are configured to store metadata sets, data quality rules, and newly generated data.

Although the server devices 204(1)-204(n) are illustrated as single devices, one or more actions of each of the server devices 204(1)-204(n) may be distributed across one or more distinct network computing devices that together comprise one or more of the server devices 204(1)-204(n). Moreover, the server devices 204(1)-204(n) are not limited to a particular configuration. Thus, the server devices 204(1)-204(n) may contain a plurality of network computing devices that operate using a master/slave approach, whereby one of the network computing devices of the server devices 204(1)-204(n) operates to manage and/or otherwise coordinate operations of the other network computing devices.

The server devices 204(1)-204(n) may operate as a plurality of network computing devices within a cluster architecture, a peer-to peer architecture, virtual machines, or within a cloud architecture, for example. Thus, the technology disclosed herein is not to be construed as being limited to a single environment and other configurations and architectures are also envisaged.

The plurality of client devices 208(1)-208(n) may also be the same or similar to the computer system 102 or the computer device 120 as described with respect to FIG. 1, including any features or combination of features described with respect thereto. Client device in this context refers to any computing device that interfaces to communications network(s) 210 to obtain resources from one or more server devices 204(1)-204(n) or other client devices 208(1)-208(n).

According to exemplary embodiments, the client devices 208(1)-208(n) in this example may include any type of computing device that can facilitate the implementation of the Kuber system 202 that may efficiently provide a platform for implementing a cloud native Kuber module, but the disclosure is not limited thereto.

The client devices 208(1)-208(n) may run interface applications, such as standard web browsers or standalone client applications, which may provide an interface to communicate with the Kuber system 202 via the communication network(s) 210 in order to communicate user requests. The client devices 208(1)-208(n) may further include, among other features, a display device, such as a display screen or touchscreen, and/or an input device, such as a keyboard, for example.

Although the exemplary network environment 200 with the Kuber system 202, the server devices 204(1)-204(n), the client devices 208(1)-208(n), and the communication network(s) 210 are described and illustrated herein, other types and/or numbers of systems, devices, components, and/or elements in other topologies may be used. It is to be understood that the systems of the examples described herein are for exemplary purposes, as many variations of the specific hardware and software used to implement the examples are possible, as will be appreciated by those skilled in the relevant art(s).

One or more of the devices depicted in the network environment 200, such as the Kuber system 202, the server devices 204(1)-204(n), or the client devices 208(1)-208(n), for example, may be configured to operate as virtual instances on the same physical machine. For example, one or more of the Kuber system 202, the server devices 204(1)-204(n), or the client devices 208(1)-208(n) may operate on the same physical device rather than as separate devices communicating through communication network(s) 210. Additionally, there may be more or fewer Kuber systems 202, server devices 204(1)-204(n), or client devices 208(1)-208(n) than illustrated in FIG. 2. According to exemplary embodiments, the Kuber system 202 may be configured to send code at run-time to remote server devices 204(1)-204(n), but the disclosure is not limited thereto.

In addition, two or more computing systems or devices may be substituted for any one of the systems or devices in any example. Accordingly, principles and advantages of distributed processing, such as redundancy and replication also may be implemented, as desired, to increase the robustness and performance of the devices and systems of the examples. The examples may also be implemented on computer system(s) that extend across any suitable network using any suitable interface mechanisms and traffic technologies, including by way of example only teletraffic in any suitable form (e.g., voice and modem), wireless traffic networks, cellular traffic networks, Packet Data Networks (PDNs), the Internet, intranets, and combinations thereof.

Figure 3:
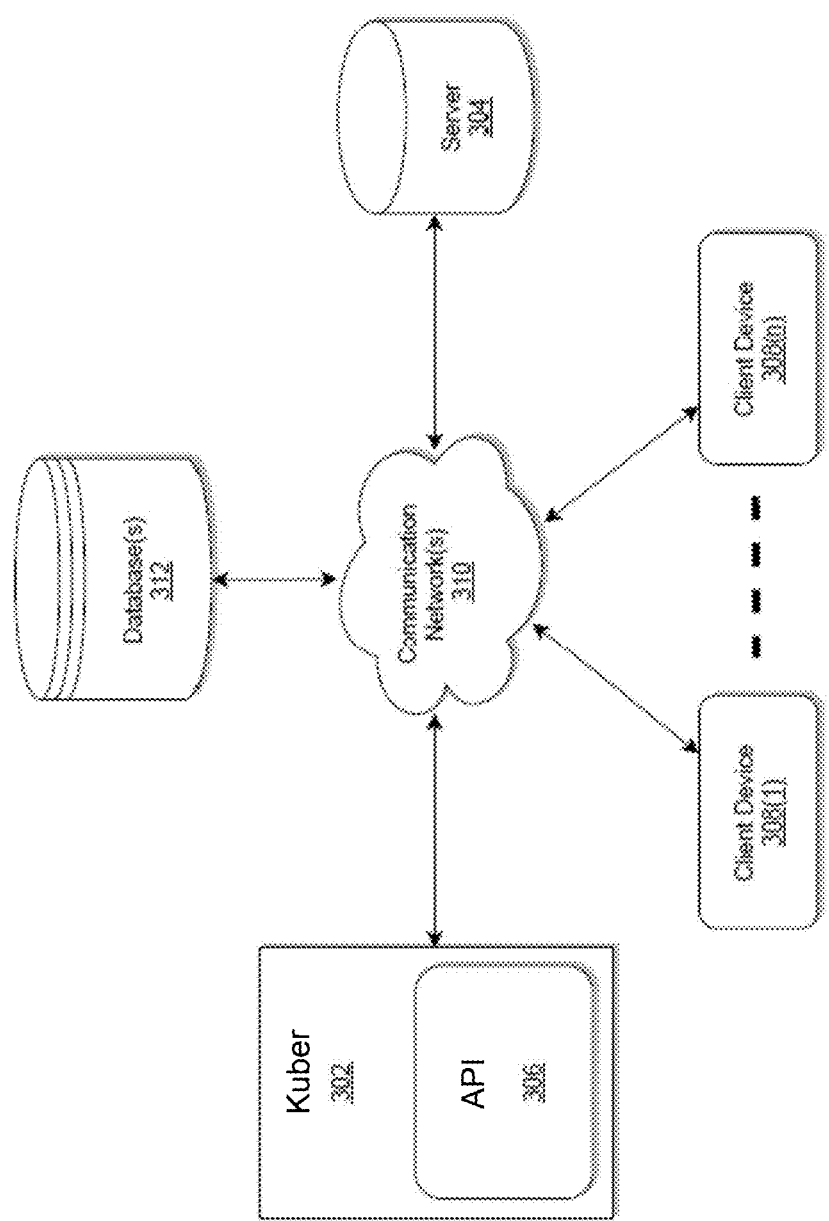
FIG. 3 illustrates a system diagram for implementing a cloud native Kuber system in accordance with an exemplary embodiment.

FIG. 3 illustrates a system diagram for implementing a cloud native Kuber system in accordance with an exemplary embodiment.

As illustrated in FIG. 3, the system 300 may include a centralized infrastructure optimization system, such as a Kuber system 302 within which a group of API modules 306 is embedded, a server 304, a database(s) 312, a plurality of client devices 308(1) . . . 308(n), and a communication network 310.

According to exemplary embodiments, the Kuber system 302 including the API modules 306 may be connected to the server 304, and the database(s) 312 via the communication network 310. Although there is only one database has been illustrated, the disclosure is not limited thereto. Any number of databases may be utilized. The Kuber System 302 may also be connected to the plurality of client devices 308(1) ... 308(n) via the communication network 310, but the disclosure is not limited thereto.

According to exemplary embodiment, the Kuber system 302 is described and shown in FIG. 3 as including the API modules 306, although it may include other rules, policies, modules, databases, or applications, for example. According to exemplary embodiments, the database(s) 312 may be embedded within the Kuber system 302. According to exemplary embodiments, the database(s) 312 may be configured to store configuration details data corresponding to a desired data to be fetched from one or more data sources, user information data etc., but the disclosure is not limited thereto.

According to exemplary embodiments, the API modules 306 may be configured to receive real-time feed of data from the plurality of client devices 308(1) ... 308(n) via the communication network 310.

According to exemplary embodiments, as will be described below, the API modules 306 may include, without limitation, request management API, automation template API, and execution API. The API modules 306 may provide a master catalog providing access to different APIs. In an example, upon authentication of a user, the API modules 306 may provide various automation request templates corresponding to an access setting of the user as specified in user profile.

The request management API may allow the user to create new automation requests, schedule the automation requests, association requests with existing automation templates, association requests with executions, search for automation requests, check status of an automation request, and trigger creation, submission, and completion notification.

The automation template API may fetch automation template inputs form attributes, retrieve automation template variables, retrieve automation template rules/formats attributes, CRUD (create, read, update and delete) for reference data, and the like.

The execution API may, without limitation, trigger data ingestion process, trigger automation processing (e.g., validation, transformation, calculation, and arrangement), trigger storage and/or transfer of resulting data and documents, and read/write logs.

The API modules 306 may be configured to implement a user interface (UI) platform that is configured to enable Kuber as a service for a desired data processing scheme. The UI platform may include an input interface layer and an output interface layer. The input interface layer may request preset input fields to be provided by a user in accordance with a selection of an automation template. The UI platform may receive user input, via the input interface layer, of configuration details data corresponding to a desired data to be fetched from one or more data sources. The user may specify, for example, data sources, parameters, destinations, rules, and the like. The UI platform may further fetch the desired data from said one or more data sources based on the configuration details data to be utilized for the desired data processing scheme, automatically implement a transformation algorithm on the desired data corresponding to the configuration details data and the desired data processing scheme to output a transformed data in a predefined format, and transmit, via the output interface layer, the transformed data to downstream applications or systems.

The plurality of client devices 308(1) ... 308(n) are illustrated as being in communication with the Kuber system 302. In this regard, the plurality of client devices 308(1) ... 308(n) may be "clients" of the Kuber system 302 and are described herein as such. Nevertheless, it is to be known and understood that the plurality of client devices 308(1) ... 308(n) need not necessarily be "clients" of the Kuber system 302, or any entity described in association therewith herein. Any additional or alternative relationship may exist between either or both of the plurality of client devices 308(1) ... 308(n) and the Kuber system 302, or no relationship may exist.

The first client device 308(1) may be, for example, a smart phone. Of course, the first client device 308(1) may be any additional device described herein. The second client device 308(n) may be, for example, a personal computer (PC). Of course, the second client device 308(n) may also be any additional device described herein. According to exemplary embodiments, the server 304 may be the same or equivalent to the server device 204 as illustrated in FIG. 2.

The process may be executed via the communication network 310, which may comprise plural networks as described above. For example, in an exemplary embodiment, one or more of the plurality of client devices 308(1) ... 308(n) may communicate with the Kuber system 302 via broadband or cellular communication. Of course, these embodiments are merely exemplary and are not limiting or exhaustive.

The computing device 301 may be the same or similar to any one of the client devices 208(1)-208(n) as described with respect to FIG. 2, including any features or combination of features described with respect thereto. The Kuber system 302 may be the same or similar to the Kuber system 202 as described with respect to FIG. 2, including any features or combination of features described with respect thereto.

Figure 4:
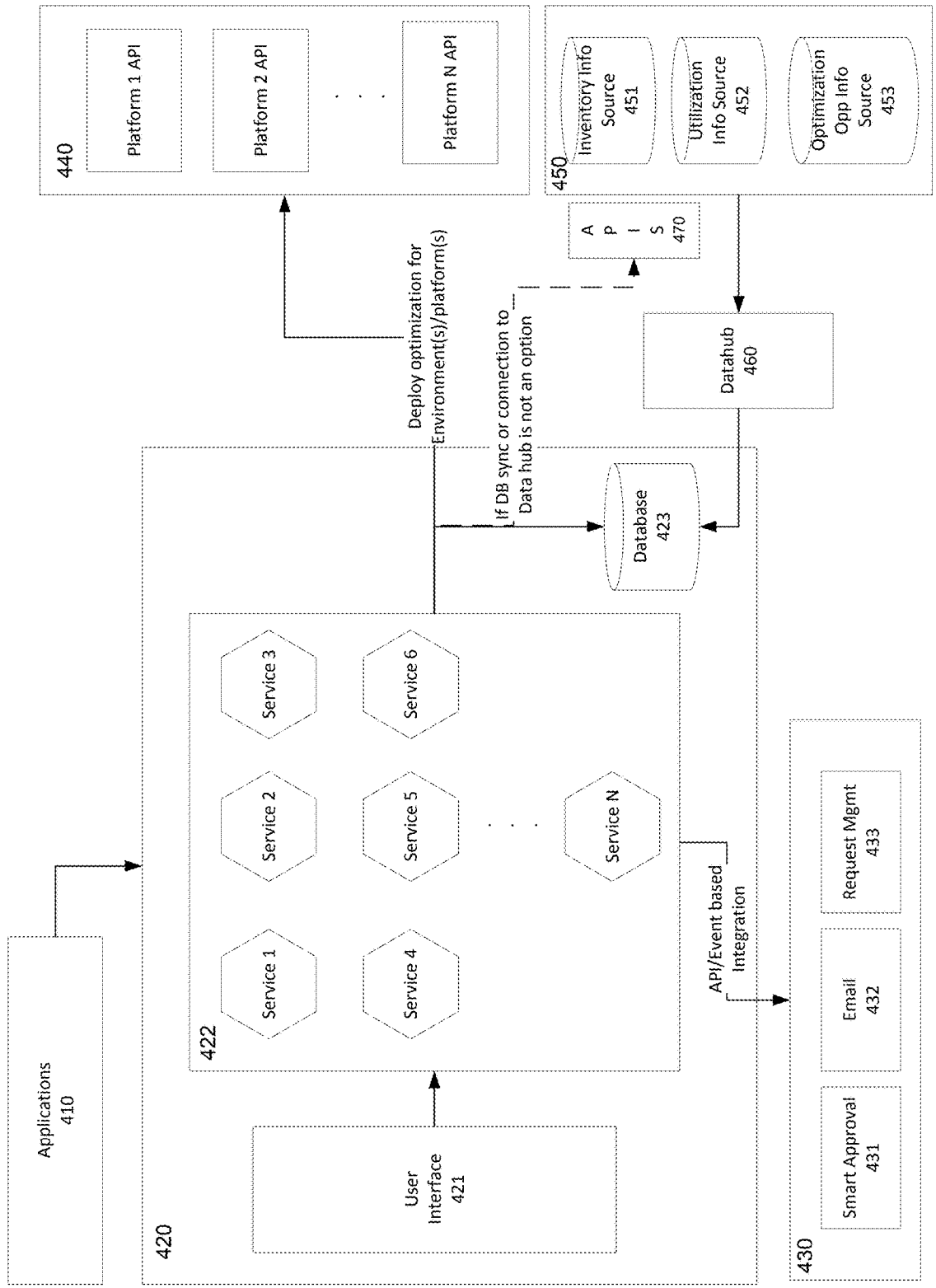
FIG. 4 illustrates a high level architecture of a Kuber system in accordance with an exemplary embodiment.

FIG. 4 illustrates a high level architecture of a Kuber system in accordance with an exemplary embodiment.

Kuber system may refer to a centralized infrastructure optimization system that allows effective usage of infrastructure resources, which may reduce operational costs while increasing technical resource (e.g., memory and CPU) availability. Apart from technical resource optimization, the Kuber system may also monitor hygiene of infrastructure resources and perform cleanup and or refresh tasks for optimal performance.

The Kuber system provides a user interface for various applications teams to register their applications for resource optimization. The application teams may configure threshold limits for various technical resources, such as memory, CPU, bandwidth and other parameters for triggering one or more optimization actions, including implementation (e.g., installation, deployment or the like) of an optimization tool.

In an example, a data collector of the Kuber system may gather data from multiple Infrastructure monitoring tools and platforms, which may transmit or emit resource utilization metrics. In response, the Kuber system's optimization engine may analyze the utilization metrics of the servers/resources running the application and generate optimization actions to be performed.

The optimization actions may be applied for the technical resource identified for optimization. The Kuber system may also route these actions through a workflow where an authorized application owner or a delegate may review and approve these actions. Such workflow may enable a controlled execution of the optimization actions and provide governance over the optimization activity.

The Kuber system may provide a single touch solution by integrating with various platform dashboards using APIs to make these operations seamless and minimize the manual intervention.

FIG. 4 illustrates one or more applications 410, a centralized infrastructure optimization system, such as a Kuber system 420, a set of event based applications 430, multiple platforms 440 for which optimizing tool(s) may be selectively generated and/or applied to, a set of databases 450 that feeds information to the Kuber system 420, and a datahub 460, which facilitates communicates between various databases included in the set of databases 450 with the Kuber system 420.

The one or more applications 410 residing in an organization's ecosystem may feed into the Kuber system 420 via API based integration. One or more of these applications may be a cross-platform application, which may reside or run on in one or more platforms of the organization's ecosystem. In an example, one or more of such applications may be a SEAL (Simple Encrypted Arithmetic Library) application, which may allow computations to be performed directly on encrypted data. An application owner may register one or more application to be optimized by the Kuber system 420.

The Kuber system 420 includes a user interface 421, a list of services eligible for selection and/or execution 422, and a database 423. In an example, the user interface 421 may include one or more interfaces, such as a web-based user interface for using the Kuber system 420, a dashboard, and a report menu.

The user interface 421 may be a specific user interface for the Kuber system 420, or an existing user interface may be utilized for accessing the Kuber system 420.

The dashboard may provide analytics for each of the platforms existing with an organization's eco system. The analytics may be performed based on data obtained from the set of databases 450, which includes inventory information sources 451, utilization information source 452, and optimization opportunity information source 453. The set of databases may be accessed directly or via one or more of APIS 470. One or more of the APIS 470 may be utilized if database sync or connection to datahub 460 cannot be established. The set of databases 450 may feed its data to the datahub 460, which feeds the received data to the database 423 included in the Kuber system 420. The Kuber system 420 then utilizes the received data for performing resource utilization analytics.

The analytics may indicate, for example, utilization of a particular platform, memory usage/availability, computer usage/availability and the like. The dashboard may additionally provide one or more optimization recommendations based on the analytics provided to free up memory resources, processing resources, and/or other computing resources to allow for a more efficient operation of the various platforms existing on the organization's eco-system.

In an example, the optimization recommendations may include, without limitation, an installation or deployment of an optimization tool, such as a light-switch, a memory optimization (e.g., memory resizing), an application hygiene (e.g., cleaning up of sandbox) optimization, a CPU optimization, decommissioning of virtual server infrastructure (VSI), and the like. One or more of the optimization recommendations may be implemented using APIs. In an example, the optimization tool for installation may not yet be generated at the time of the optimization recommendation, and instead may be generated/built dynamically upon approval to install the respective optimization tool.

Installing of a light switch may refer to installation of a virtual switch for an application, which may be in a running status. The light switch installation may be performed using a Luminaire API. The light switch may also have a default "OFF" configuration. The default "OFF" configuration may shutdown any new instance that is deployed to release memory occupied by the new instance. If the new instance of the respective application is a test/sandbox instance, the light-switch may trigger its default "OFF" operation to turn the new instance off and release its memory occupied even if developers forget to delete the new instance after testing. If it is not a sandbox instance, the development team may specify its "ON" and "OFF" configuration and re-deploy the light-switch configuration with the configurations shared as part of the optimization tool implementation. These inactive operations that are present may be trashed by the hygiene API, and thereby releasing the reserved memory.

Optimizing of memory resource may include resizing of previously allocated memory, freeing of memory and the like. For example, a memory optimizer API may scan through active live usage across various platforms, and optimizes the live usage and perform necessary scans in the bit bucket's memory settings, update values and submit a pull request for an application team, thereby closing a loop of revising memory down scale. More specifically, a memory scan may indicate, for example, a size of memory allocation for an application or VSI, maximum memory used for a recent duration (e.g., last 3 months), memory utilization and the like. Based on such usage information, memory allocations may be revised accordingly or more efficient memory allocation and to free up unused memory resources.

Application hygiene API may scan through a respective platform to detect any unused applications, services and/or routes, and release the detected unused applications, services, and/or routes to free up resources and maintain cleanliness of the resources.

Optimizing CPU resources may include scanning of active CPU usage across various VSIs, and reconfiguring CPU resources based on active CPU usage. For example, CPU resources from less frequently utilized VSIs may be reallocated, at least for a limited time, to a more heavily accessed or utilized VSI. More specifically, a CPU scan may indicate, for example, size of CPU allocation, maximum CPU utilization used for a recent duration (e.g., last 3 months), average or current CPU utilization and the like for the VSIs. Based on such usage information, CPU allocations for the VSIs may be revised accordingly to free up unused CPU resources and to provide a more efficient CPU allocations.

Decommissioning of VSIs may also be performed via an API. For example, various platforms may be scanned to identify active status of the VSIs. If a VSI is determined to be inactive during or after the scan, the VSI may be decommissioned to free up resources that were previously allocated to the respective VSI.

The list of eligible service functions for execution 422 may include multiple of service functions, which may increase upwards to an N value, in which N is an integer value. In an example, the service functions may be built as APIs, which may enable greater extensibility and integration. The list of eligible service functions for execution 422 may include, without limitation, complete optimization recommendation, optimization rules, optimization scheduler, data ingestion scheduler, application specific optimization rules, approval request, application of optimization, auto optimizer, optimizer workflow, application optimization preferences, notifications, audit optimization actions, retrieve optimizations, and report generator. However, aspects of the present disclosure are not limited thereto, such that more or less services may be added thereto.

As indicated above, a user of the Kuber system 420 may access a list of optimization recommendations to implement, view/or modify optimization rules, and schedule performance of selected optimizations. Further, data ingestion schedule may additionally be specified, such that additional data are ingested at a specified schedule for obtaining determining updated optimization recommendations. The optimization rules may be also viewed or modified at an application level, such that different application may have different optimization rules to abide by. In addition to the above, the optimization may be requested by an application owner, or by another user upon obtaining approval from the application owner. The optimizations may be set to be performed on an automated basis, and/or in accordance to optimization preferences set by a user. A user may also view the workflow status (e.g., scheduled, installed/completed, failed, request denied and etc.) of the optimizer. Further, notifications settings may be specified or modified, and previous optimizations may be audited or retrieved. Various reporting capabilities may be provided, which may capture various optimizations executed, applications that were optimized, platforms that were optimized, requester information, approval information, status of the optimizations, optimizations to be performed, and the like.

In an example, the optimization recommendations may be provided based on a set of rules. For example, the set of rules may be application specific, platform specific, or uniformly applied. The set of rules may include, for example, a threshold limit for memory utilization, CPU utilization and/or other parameters. Once one or more of the threshold values are reached, the Kuber system 420 may generate optimization action for the affected application(s).

Further, the optimization recommendation may be provided by an artificial intelligence or machine learning algorithms (AIML) based on a data pattern detection. More specifically, one or more optimization tools may be automatically selected for installation or deployment by a machine learning algorithm or artificial intelligence based on a historical pattern of data. Further, along with the selection of the optimization tools, scheduling of the optimization tool installation or deployment may be automatically configured by the AIML. In an example, machine learning may refer to computer algorithms that may improve automatically through use of data. Machine learning algorithm may build an initial model based on sample or training data, which may be iteratively improved upon as additional data are acquired.

One of the services eligible for selection and/or execution 422 may trigger a request to install or deploy one or more optimization tools for at least one platform or environment selected among the multiple platforms 440. Once triggered, and upon having necessary approvals, the selected optimization tools may be installed or deployed onto the selected platform/environment.

According exemplary aspects of the present disclosure, the multiple platforms 440 may include a platform 1 API, a platform 2 API, and up to a platform N API, in which N is an integer. In an example, at least one of the platforms may be different from the other platforms. Further, although at least three platforms are exemplarily illustrated in FIG. 4, aspects of the disclosure are not limited thereto, such that it may be two or less.

Moreover, one of the services eligible for selection and/or execution 422 may trigger an API or an event based integration signal or message to be transmitted to the set of event based applications 430 for further execution. Based on the content of the API/event based integration signal or message, one or more of a smart approval API 431, an email program 432, and a request management system 433 may be executed for further processing.

For example, upon completion of installation or deployment of an optimization tool for an application in a selected platform, an event may be generated and a notification for the installation/deployment may be transmitted to the email program 432 via an API, triggering an email to the respective application owner to be sent.

Alternatively, if an approval is necessary for the application for which the optimization tool is to be installed or deployed on, the smart approval API 431 may be triggered to contact the respective application owner for approval.

Further, once a request for optimization has been submitted, the submitted request may be sent to the request management system 433 for processing and cataloging the submitted requests. Further, implementation process of the optimization tools may be tracked and updated by the request management system.

Figure 5:
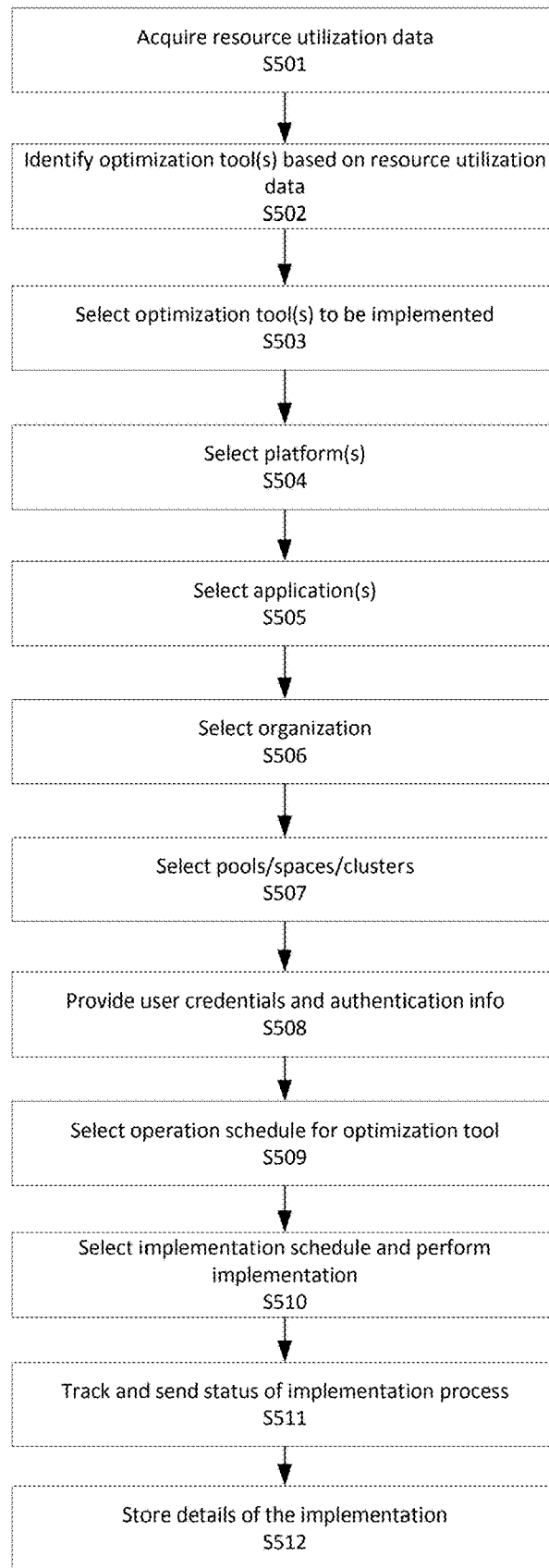
FIG. 5 illustrates a method for performing an automated optimization tool implementation in accordance with an exemplary embodiment.

FIG. 5 illustrates a method for performing an automated optimization tool implementation in accordance with an exemplary embodiment.

In operation S501, system resource utilization data may be acquired from various sources. System resource utilization data may include, without limitation, memory utilization, CPU utilization, application running time and the like. Such system resource utilization data may be aggregated and grouped according to a platform level, environment level, application level, organization level and the like.

In operation S502, one or more optimization tools may be identified for optimizing system performance. For example, if the system performance data indicates high memory utilization for a particular platform, one or more optimization tools directed to alleviating high memory utilization may be identified and displayed for selection.

In operation S503, a user may select one or more optimization tools to be automatically implemented (e.g., installation or deployment) via a user interface to a Kuber system. In an example, optimization tools may include, without limitation, automated implementation/installation/deployment of a virtual light switch, a memory optimization API, an application hygiene API, a CPU optimization API, a decommission API and the like. In an example, the installation of the virtual light switch or light switch may be performed or initiated by a luminaire API provided in the Kuber system. However, aspects of the present disclosure are not limited thereto, such that all of the optimization tools may be set to run automatically, or a certain sets of optimization tools may be selected for execution based on a predetermined setting/frequency/condition.

In operation S504, one or more platforms or environments may be selected for implementation of the selected optimization tool(s).

In operation S505, one or more applications may be selected for implementation of the selected optimization tools. In an example, when an application owner selects the optimization tools for implementation, one or more of the applications owned by the application owners may be selected as a default. However, the application owner may additionally select one or more applications that are not owned by the application owner (owned by another) for the optimization tool(s) to be applied to. In such cases, the other owner may be requested to provide an approval or a seal before the optimization tools may be implemented, installed or deployed to the one or more applications that are owned by the other owner.

In operation S506, relevant organization may also selected for implementation of the selected optimization tools. In such a case, the implementation of the optimization tools may be limited to the selected organization(s).

In operation S507, one or more pools/space/cluster may be selected. In an example, space may refer to a particular environment, such as testing environment, development environment and so on. A pool may refer to a portion or sub-division of the space. In an example, pools may refer to space and resources that are pooled to serve multiple clients at a time. A cluster, on the other hand, may refer to a set of interconnected resources.

In operation S508, user credentials and authentication information may be requested to verify whether the user requesting the optimization tools implementation has appropriate rights for the request.

In operation S509, an operation schedule may be specified for the optimization tool(s). For example, the optimization tools may be set to be operational on certain days of the week, certain times of the day, or like. However, aspects of the present disclosure are not limited thereto, such that the optimization tools may be set to be operational based on meeting a certain condition.

In operation S510, an implementation schedule may be selected for the implementation (e.g., installation or deployment) of the optimization tool. In an example, the implementation or installation schedule may be set automatically by an orchestrator or a scheduler based on the parameters of the request for the optimization tool. For example, certain implementations may be prioritized in accordance to the potential benefit of the optimization tools being requested to be implemented. More specifically, if memory resources are more in need, optimization tools directed to freeing up more memory resources may be prioritized over optimization tools directed to freeing up more CPU resources. Once an optimization tool is ready for implementation, an automated installation or deployment may be performed. In an example, a user may submit an installation or deployment request (e.g., by clicking of a single button, or providing of a single input), which may initiate an automated code generation for installing or deploying the selected optimization tools. Accordingly, a user with little or no technical skills may select various optimization tools to optimize operating of an application, platform, environment, infrastructure or the like.

In operation S511, as the optimization tools are scheduled for the implementation, status of the implementation request process may be iteratively tracked and reported. In an example, the status may indicate that the request process may be awaiting approval from an application owner, the request is in queue, a particular order in queue, expected implementation schedule, expected completion time, that it is in process, or that the implementation has been completed. Such status information may be provided in a data form, text form, graphical form or the like, such that the requesting user may be able to track the implementation progress of the selected optimization tools.

In operation S512, upon completion of the implementation, details of the implementation may be stored in a storage for later review or audit. For example, details of the implementation may specify identity of a requesting user, identity of approval (if approvals were necessary), time stamp of the request, time stamp of completion, results of implementation, resource saving realized and the like. Such information may additionally be fed into an AIML algorithm, such that more effective optimizations may be performed based on prior resource savings at a frequency determined to be most effective. Further the AIML in access to such information may additionally identify problematic resources or practice group.

Figure 6A:
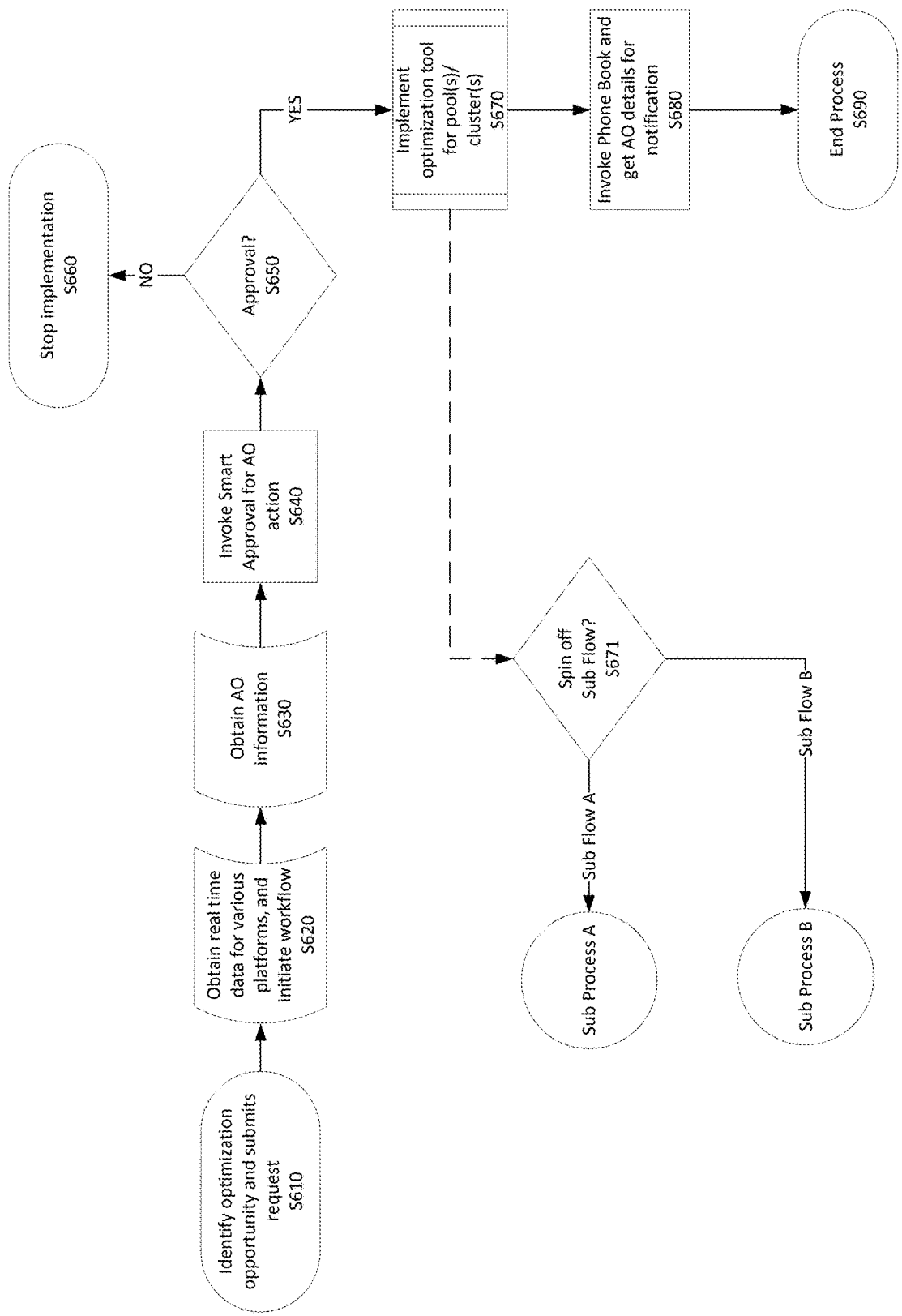
FIGS. 6A-6B illustrates an approval process for performing automated optimization tool implementation in accordance with an exemplary embodiment.
Figure 6B:
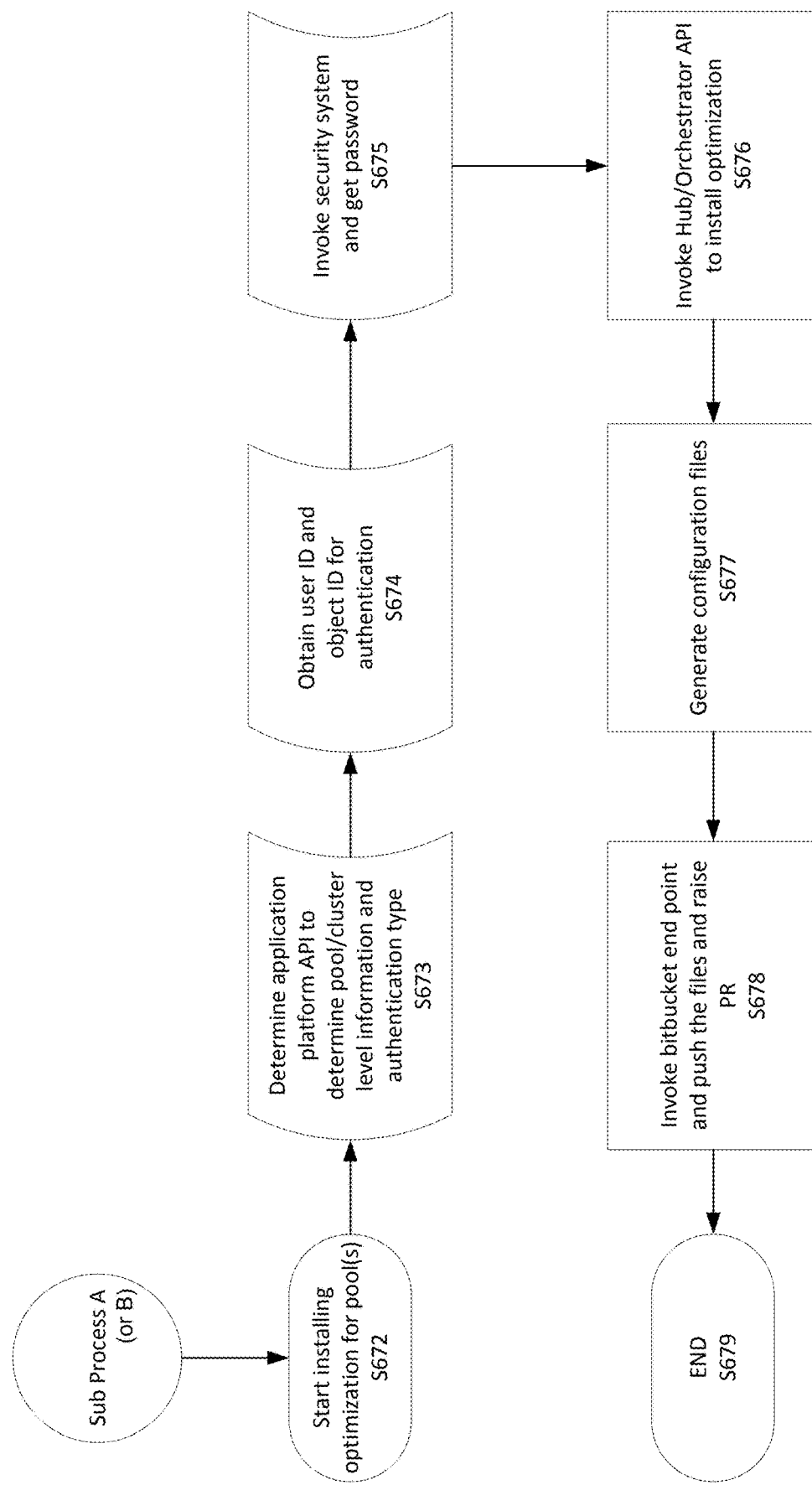

FIGS. 6A-6B illustrates an approval process for performing automated optimization tool implementation in accordance with an exemplary embodiment.

In operation S610, one or more optimization opportunities may be identified on a user interface, such as a dashboard, and a request for implementation (e.g., installation and/or deployment) of one or more optimization tools may be submitted to a centralized infrastructure optimization system, such as a Kuber system.

In operation S620, real time performance data for various platforms may be obtained, and a corresponding workflow is initiated. In an example, performance data may include memory utilization rate, CPU utilization rate, network transmission/reception rate, and the like. Performance data may be provided for each of the platforms or environments included in an eco-system. Further, a workflow for the selected optimization tool is initiated for each of the platforms selected for application of the optimization tool.

In operation S630, information of the application owner (AO) is obtained for the application for which the optimization tool is to be applied. The application owner's information may include name, employee identification, title, contact information, a listing of applications owned, and the like.

In operation S640, if the application owner is different from the requesting user, a smart approval is invoked for the application owner to take action. In an example, the smart approval form may indicate a request identifier, identification of the requestor, application for which the optimization tool is being requested, status of the request, request date, the optimization tool that is being requested for implementation, description and the like.

In operation S650, the application owner decides whether to approve or deny the request. If the request is denied, then the process ends in operation S660 and the requested optimization tool is not implemented for the application owned by the application owner. On the other hand, if the request is approved by the application owner, then the optimization tool is implemented for the pool(s)/cluster(s) specified in the request in operation S670. The implementation process of S670 includes a number of sub-operations. During the implementation process, one or more of the spinoff sub flows may be identified in operation S671. For example, sub flows may be created for each of the platforms or environments (e.g., GAP, GKP or the like) selected for the optimization tool installation or deployment request.

For each of the sub flows, sub-operations illustrated in FIG. 6B may be performed. In an example, FIG. 6B may illustrate a sub flow for installing a light switch optimization tool. However, aspects of the present disclosure are not limited thereto. Further, although FIG. 6B is indicated as illustrating a method for sub process A, aspects of the present disclosure are not limited thereto, such that FIG. 6B may also be representative of sub process B.

In operation S672, the optimization tool installation is started for the pools selected. Although only pools are indicated, aspects of the present disclosure are not limited thereto, such that it may be started for spaces and clusters as applicable.

In operation S673, a system status API is invoked to determine pool or cluster level information and authentication type or model. In addition, relevant egress policy may be obtained based on the platform or environment. For example, a determination of a pool authentication URL to generate a token for authentication with the system API, and its authentication type (e.g., AD/LDAP) may be made. Further, the authentication URL may change for every pool and space in the respective platform. For every current pools, spaces, future pools that are to be added to the system, and/or upgrades lined up with authentication mechanism, latest information is taken from the system status API every time. Alternatively, if cluster level information is obtained, then latest cluster information and namespace information may be obtained.

In operation S674, a search tool API may be invoked to obtain security details (e.g., password or other security information) of a given FID (federated identity) based on the authentication model of a given pool, space or cluster.

In operation S675, an identity security and access management system will retrieve password for the given FID based on its object, safe, and app ID. Further, the identity security and access management system will invoke one or more parameters of a given cluster to generate a login authentication token.

In operation S676, the requested optimization tool is implemented for the selected platform and pool/space/cluster. In an example, the optimization tool may be a light switch. If the light-switch is already installed, configuration to the existing light switch may be updated with the new configuration that is generated as a part of the installation request. On the other hand, if the light switch does not exist, then a fresh installation is performed. In part of the installation, an external dependency service may be created, which carries security details (e.g., password) for future scheduler execution. The above noted installation process may be iteratively performed for every pool that was requested for the optimization tool install or deployment.

In operation S677, once the implementations have been performed for every pool/space/cluster requested, configuration files for the installed or deployed optimization tool may be generated.

In operation S678, once the configuration files are generated, then bit-bucket API's are invoked for a project and the generated configuration files are pushed into the bit-bucket and committed. Further, pull request is raised for the configuration files so that an application team may leverage the configuration files for future updates to the optimization tool timings and schedules. Subsequently, the sub-flow will terminate in S679, and operation S680 is continued.

Upon implementation of the selected optimization tool(s), a phone book application is invoked to obtain application owner contact details (e.g., email address), and notification is provided to the application owner of the implementation status based on the application owner contact details in operation S680. Upon notification, this portion of the process is terminated in operation S690.

Figure 7:
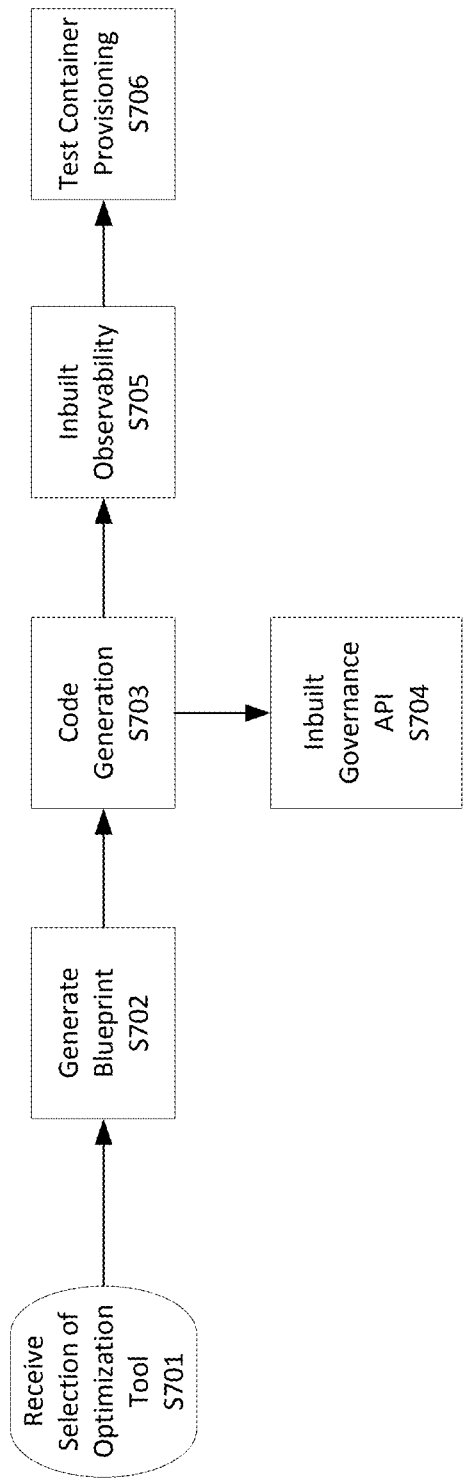
FIG. 7 illustrates an automated code generation for optimization tool selected in accordance with an exemplary embodiment.

FIG. 7 illustrates an automated code generation for optimization tool selected in accordance with an exemplary embodiment.

In operation S701, a selection of one or more optimization tool(s) may be made on a user interface of a Kuber system. Upon making a selection of the one or more optimization tool(s) along with selection of corresponding parameters, the request user may be requested to confirm his or her request. Upon confirmation, a one click implementation or installation process for the selected optimization tool(s) may be initiated.

In operation S702, the automated installation process for the selected optimization tools may be initiated. For example, the installation process may begin with generation of blueprint for the optimization tools to be installed.

In operation S703, once blueprinting for the optimization tool or tools has been performed, code may be generated based on the generated blueprint.

In operation S704, inbuilt governance API is generated. Based on the API governance, consistency with other APIs may be enabled.

In operation S705, observability of the generated code for the optimization tool is generated. Accordingly, internal states or performance of the generated optimization tool may be measured or observed.

In operation S706, the optimization tool code is provisioned into a test container, for more expedient testing processing and/or resolve dependency management problems.

Further, although the invention has been described with reference to several exemplary embodiments, it is understood that the words that have been used are words of description and illustration, rather than words of limitation. Changes may be made within the purview of the appended claims, as presently stated and as amended, without departing from the scope and spirit of the present disclosure in its aspects. Although the invention has been described with reference to particular means, materials and embodiments, the invention is not intended to be limited to the particulars disclosed; rather the invention extends to all functionally equivalent structures, methods, and uses such as are within the scope of the appended claims.

For example, while the computer-readable medium may be described as a single medium, the term "computer-readable medium" includes a single medium or multiple media, such as a centralized or distributed database, and/or associated caches and servers that store one or more sets of instructions. The term "computer-readable medium" shall also include any medium that is capable of storing, encoding or carrying a set of instructions for execution by a processor or that cause a computer system to perform any one or more of the embodiments disclosed herein.

The computer-readable medium may comprise a non-transitory computer-readable medium or media and/or comprise a transitory computer-readable medium or media. In a particular non-limiting, exemplary embodiment, the computer-readable medium can include a solid-state memory such as a memory card or other package that houses one or more non-volatile read-only memories. Further, the computer-readable medium can be a random access memory or other volatile re-writable memory. Additionally, the computer-readable medium can include a magneto-optical or optical medium, such as a disk or tapes or other storage device to capture carrier wave signals such as a signal communicated over a transmission medium. Accordingly, the disclosure is considered to include any computer-readable medium or other equivalents and successor media, in which data or instructions may be stored.

Although the present application describes specific embodiments which may be implemented as computer programs or code segments in computer-readable media, it is to be understood that dedicated hardware implementations, such as application specific integrated circuits, programmable logic arrays and other hardware devices, can be constructed to implement one or more of the embodiments described herein. Applications that may include the various embodiments set forth herein may broadly include a variety of electronic and computer systems. Accordingly, the present application may encompass software, firmware, and hardware implementations, or combinations thereof. Nothing in the present application should be interpreted as being implemented or implementable solely with software and not hardware.

Although the present specification describes components and functions that may be implemented in particular embodiments with reference to particular standards and protocols, the disclosure is not limited to such standards and protocols. Such standards are periodically superseded by faster or more efficient equivalents having essentially the same functions. Accordingly, replacement standards and protocols having the same or similar functions are considered equivalents thereof.

The illustrations of the embodiments described herein are intended to provide a general understanding of the various embodiments. The illustrations are not intended to serve as a complete description of all of the elements and features of apparatus and systems that utilize the structures or methods described herein. Many other embodiments may be apparent to those of skill in the art upon reviewing the disclosure. Other embodiments may be utilized and derived from the disclosure, such that structural and logical substitutions and changes may be made without departing from the scope of the disclosure. Additionally, the illustrations are merely representational and may not be drawn to scale. Certain proportions within the illustrations may be exaggerated, while other proportions may be minimized. Accordingly, the disclosure and the figures are to be regarded as illustrative rather than restrictive.

One or more embodiments of the disclosure may be referred to herein, individually and/or collectively, by the term "invention" merely for convenience and without intending to voluntarily limit the scope of this application to any particular invention or inventive concept. Moreover, although specific embodiments have been illustrated and described herein, it should be appreciated that any subsequent arrangement designed to achieve the same or similar purpose may be substituted for the specific embodiments shown. This disclosure is intended to cover any and all subsequent adaptations or variations of various embodiments. Combinations of the above embodiments, and other embodiments not specifically described herein, will be apparent to those of skill in the art upon reviewing the description.

The Abstract of the Disclosure is submitted with the understanding that it will not be used to interpret or limit the scope or meaning of the claims. In addition, in the foregoing Detailed Description, various features may be grouped together or described in a single embodiment for the purpose of streamlining the disclosure. This disclosure is not to be interpreted as reflecting an intention that the claimed embodiments require more features than are expressly recited in each claim. Rather, as the following claims reflect, inventive subject matter may be directed to less than all of the features of any of the disclosed embodiments. Thus, the following claims are incorporated into the Detailed Description, with each claim standing on its own as defining separately claimed subject matter.

The above disclosed subject matter is to be considered illustrative, and not restrictive, and the appended claims are intended to cover all such modifications, enhancements, and other embodiments which fall within the true spirit and scope of the present disclosure. Thus, to the maximum extent allowed by law, the scope of the present disclosure is to be determined by the broadest permissible interpretation of the following claims and their equivalents, and shall not be restricted or limited by the foregoing detailed description.

What is claimed is:

1. A method for dynamically generating and implementing optimization solutions via a centralized cloud based system for increasing available resources of a cloud based infrastructure, the method comprising:
    acquiring, by a processor and for at least one platform, resource utilization data, wherein the resource utilization data includes memory usage/availability, and wherein the acquiring includes scanning of active computing resource usage across a plurality of virtual server infrastructures;
    identifying, by the processor, a plurality of optimization tools based on the acquired resource utilization data;
    selecting, among the plurality of optimization tools identified, at least one optimization tool for implementation, wherein the at least one optimization tool for implementation performs resizing of memory allocation for one or more applications;
    selecting at least one application to which the at least one optimization tool is to be implemented for modifying a size of memory allocation for the at least one application selected;
    selecting one or more platforms for the selected at least one application;
    receiving an input to submit a request for implementation of the at least one optimization tool;
    dynamically and automatically generating, by the processor, the at least one optimization tool; and
    implementing the at least one optimization tool dynamically and automatically generated for the at least one application selected, that is residing in the one or more platforms selected, and performing the modifying the size of the memory allocation for the at least one application selected, that is residing in the one or more platforms selected.

2. The method according to claim 1, wherein
    the implementation of the at least one optimization tool includes installation of a light switch, the light switch is configured to be installed for applications that are currently running and is defaulted to be in an off status to release memory occupied by an instance of the at least one application selected.

3. The method according to claim 1, wherein the implementation of the at least one optimization tool includes deployment of a memory optimization API, the memory optimization API scans the at least one platform to determine current memory utilization and performs the resizing of the memory allocation at a micro-service level.

4. The method according to claim 1, wherein
    the implementation of the at least one optimization tool includes deployment of a CPU optimization API, the CPU optimization API scans the at least one platform to determine CPU utilization and reallocates CPU resources based on the determined CPU utilization.

5. The method according to claim 1, wherein
    the implementation of the at least one optimization tool includes deployment of a hygiene API, the hygiene API scans through the at least one platform to detect unused applications, services or routes and releases the unused applications, services or routes.

6. The method according to claim 1, wherein
    the implementation of the at least one optimization tool includes deployment of a decommission API, the decommission API scans through the at least one platform to detect one or more unused virtual server infrastructures, and decommission the one or more unused VSIs to release resources tied thereto.

7. The method according to claim 1, wherein the input received to initiate implementation is a single click.

8. The method according to claim 1, further comprising:
determining whether the at least one application selected is owned by a user submitting the request for implementation;
when the at least one application selected is not owned by the user submitting the request:
identifying application owner information for the at least one application selected,
generating an approval request for the implementation of the at least one optimization tool to the at least one application selected, the approval request including a configuration route to a URL, and
proceeding with the implementation of the at least one optimization tool when approval is received from the application owner; and
when the at least one application selected is owned by the user submitting the request, proceeding with the implementation of the at least one optimization tool.

9. The method according to claim 1, wherein the dynamically and automatically generating of the at least one optimization tool includes:
generating a blueprint for the at least one optimization tool;
generating code for the blueprint; and
provisioning of the code in a test container.

10. The method according to claim 1, further comprising:
selecting of space and pools for the implementation of the at least one optimization tool.

11. The method according to claim 1, further comprising:
selecting of at least one cluster for the implementation of the at least one optimization tool.

12. The method according to claim 1, further comprising:
selecting a schedule for the implementation of the at least one optimization tool,
wherein the schedule is selected in accordance with a priority of the at least one optimization tool.

13. The method according to claim 1, further comprising:
setting an operation schedule for the at least one optimization tool to be implemented, such that the at least one optimization tool is operating at select time intervals.

14. The method according to claim 1, further comprising:
tracking of implementation status of the at least one optimization tool; and
providing of the implementation status on a display.

15. The method according to claim 1, wherein the plurality of optimization tools are identified based on the acquired resource utilization data with respect to threshold values set.

16. The method according to claim 1, wherein the plurality of optimization tools are identified based on one or more data patterns recognized in the acquired resource utilization data by an artificial intelligence or machine learning algorithm.

17. The method according to claim 1, further comprising:
generating configuration files for the at least one optimization tool implemented;
pushing the configuration files into a bi-bucket; and
raising pull-request.

18. The method according to claim 1, wherein, when an optimization tool has been previously implemented, updating configuration information of the optimization tool to update its configuration with the acquired resource utilization data.

19. A centralized cloud based system for dynamically generating and implementing optimization solutions to increase available resources of a cloud based infrastructure, the centralized cloud based system comprising:
a processor;
a memory; and
a communication circuit,
wherein the processor is configured to:
acquire, for at least one platform, resource utilization data, wherein the resource utilization data includes memory usage/availability, and wherein acquiring of the resource utilization data includes scanning of active computing resource usage across a plurality of virtual server infrastructures;
identify a plurality of optimization tools based on the acquired resource utilization data;
select, among the plurality of optimization tools identified, at least one optimization tool for implementation, wherein the at least one optimization tool for implementation performs resizing of memory allocation for one or more applications;
select at least one application to which the at least one optimization tool is to be implemented for modifying a size of memory allocation for the at least one application selected;
select one or more platforms for the selected at least one application;
receive an input to submit a request for implementation of the at least one optimization tool;
dynamically and automatically generate the at least one optimization tool; and
implement the at least one optimization tool dynamically and automatically generated for the at least one application selected, that is residing in the one or more platforms selected, and perform the modifying the size of the memory allocation for the at least one application selected, that is residing in the one or more platforms selected.

20. A non-transitory computer readable storage medium that stores a computer program for dynamically generating and implementing optimization solutions via a centralized cloud based system for increasing available resources of a cloud based infrastructure, the computer program, when executed by a processor, causing a system to perform a process comprising:
acquiring, for at least one platform, resource utilization data, wherein the resource utilization data includes memory usage/availability, and wherein the acquiring includes scanning of active computing resource usage across a plurality of virtual server infrastructures;
identifying a plurality of optimization tools based on the acquired resource utilization data;
selecting, among the plurality of optimization tools identified, at least one optimization tool for implementation, wherein the at least one optimization tool for implementation performs resizing of memory allocation for one or more applications;
selecting at least one application to which the at least one optimization tool is to be implemented for modifying a size of memory allocation for the at least one application selected;
selecting one or more platforms for the selected at least one application;
receiving an input to submit a request for implementation of the at least one optimization tool;
dynamically and automatically generating the at least one optimization tool; and
implementing the at least one optimization tool dynamically and automatically generated for the at least one application selected, that is residing in the one or more platforms selected, and performing the modifying the size of the memory allocation for the at least one application selected, that is residing in the one or more platforms selected.

\* \* \* \* \*